May 15, 1934.     E. J. HISCOCK     1,959,237
MACHINE FOR GRADING ARTICLES BY WEIGHT
Filed Oct. 27, 1932     4 Sheets-Sheet 1

INVENTOR
Ernest J. Hiscock
By
ATTORNEY

May 15, 1934.  E. J. HISCOCK  1,959,237
MACHINE FOR GRADING ARTICLES BY WEIGHT
Filed Oct. 27, 1932   4 Sheets-Sheet 2

INVENTOR
Ernest J. Hiscock
By
ATTORNEY

May 15, 1934.　　　　E. J. HISCOCK　　　　1,959,237
MACHINE FOR GRADING ARTICLES BY WEIGHT
Filed Oct. 27, 1932　　　4 Sheets-Sheet 3
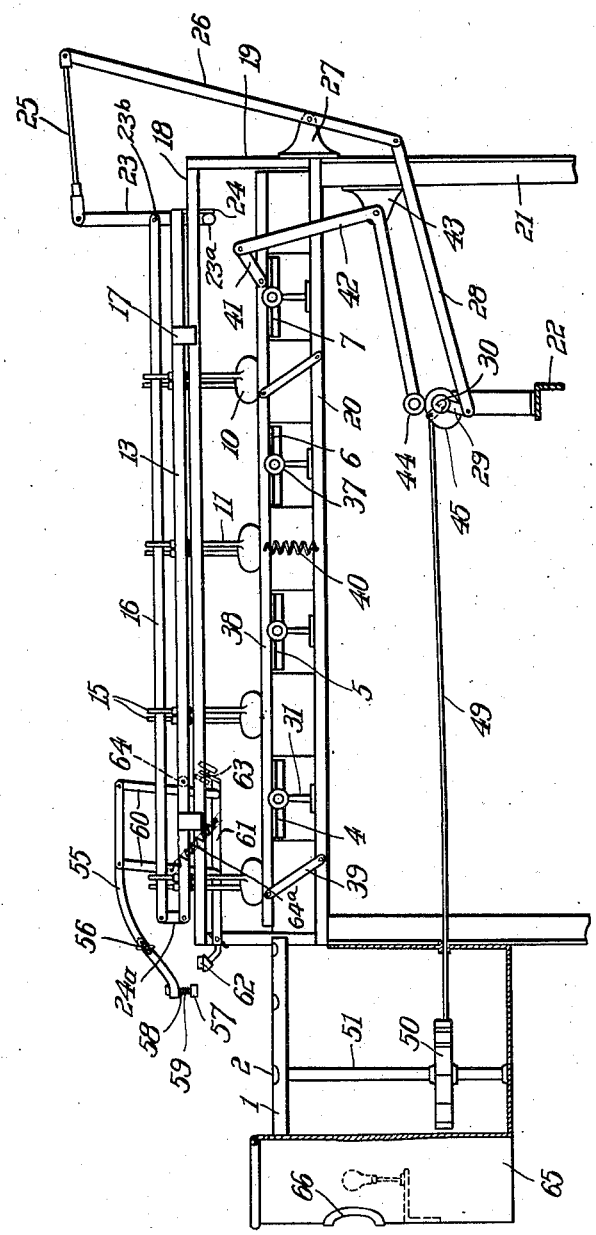
Fig.3
INVENTOR
Ernest J. Hiscock
By 
ATTORNEY May 15, 1934.  E. J. HISCOCK  1,959,237
MACHINE FOR GRADING ARTICLES BY WEIGHT
Filed Oct. 27, 1932  4 Sheets-Sheet 4

INVENTOR
Ernest J. Hiscock
By
ATTORNEY

Patented May 15, 1934

1,959,237

UNITED STATES PATENT OFFICE 1,959,237

MACHINE FOR GRADING ARTICLES BY WEIGHT

Ernest James Hiscock, Trowbridge, England

Application October 27, 1932, Serial No. 639,895
In Great Britain October 7, 1932

3 Claims. (Cl. 209—121)

This invention relates to machines for grading articles such as eggs, packet goods, butter and the like according to their weight and has for its object to provide an improved machine of the kind wherein the articles to be graded are caused to traverse a series of scale pans each responsive to a different weight.

According to the invention apparatus for grading articles by weight is provided comprising a series of weighing devices each responsive to a different weight and gripping devices adapted to transfer articles from one weighing device to another and to release such articles automatically for the weighing operation.

The invention also consists in apparatus for grading articles by weight comprising a series of scale pans each responsive to a different weight and a series of reciprocal gripping elements disposed above said scale pans and adapted to transfer the articles to be graded across said scale pans by intermittent movements.

According to the preferred form of the invention apparatus for grading articles by weight comprises a series of scale pans, a carriage reciprocable above said scale pans, a series of gripping elements carried by said carriage, means for opening said gripping elements during travel in one direction and closing them during travel in the opposite direction, means for bringing the articles to be graded one at a time into the path of said gripping members and a series of trays for receiving separately the articles discharged by the scale pans.

Reference will now be made to the accompanying drawings which illustrate by way of example constructions according to the invention and in which:—

Figure 1:
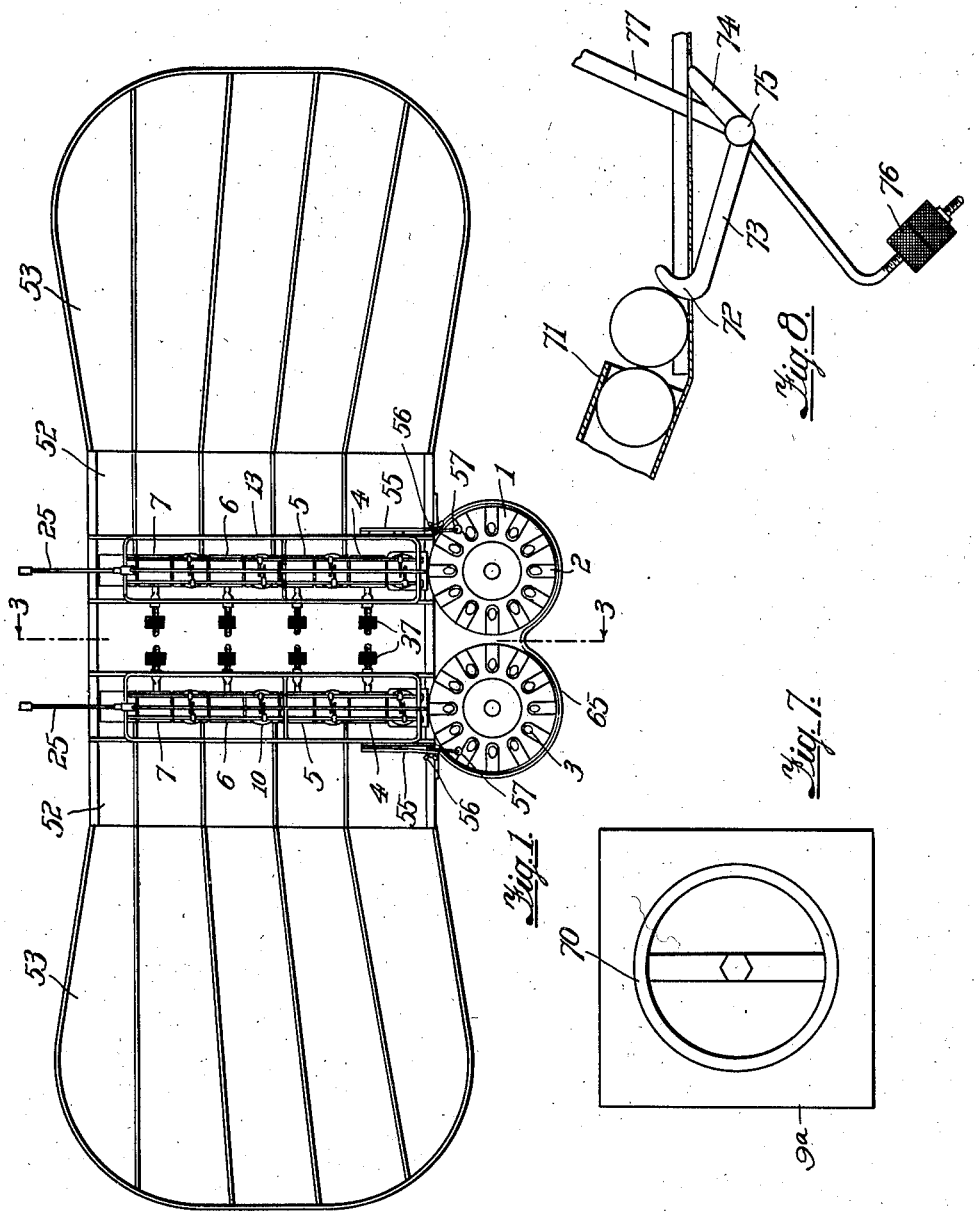
Fig. 1 is a plan of a complete machine designed for grading eggs.
Figure 4:
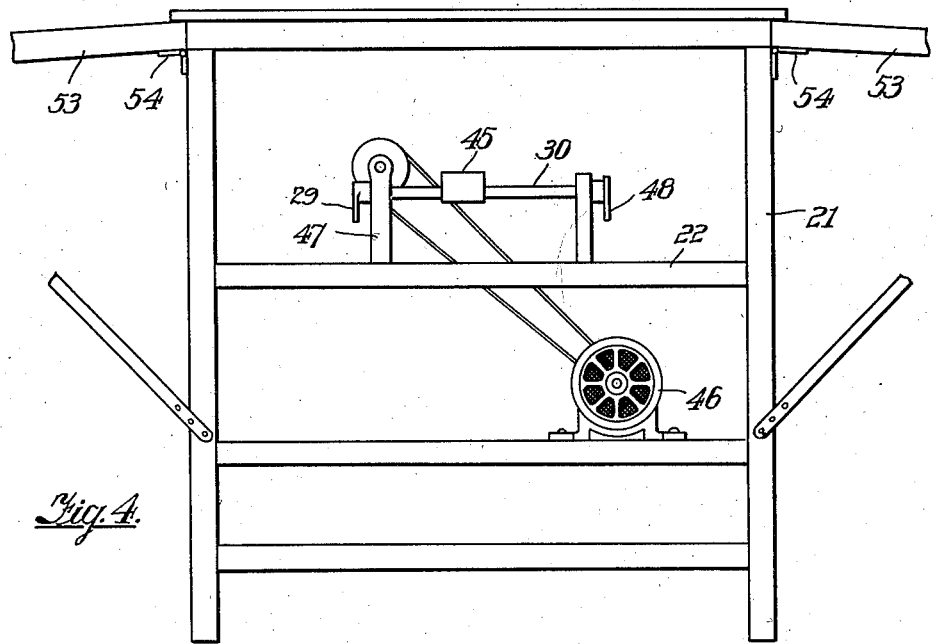
Figure 5:
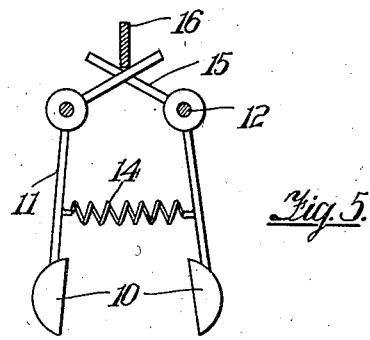
Figure 6:
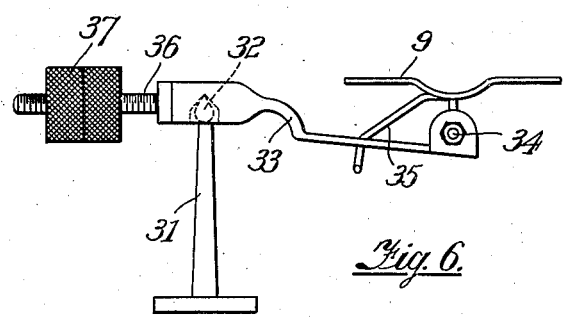

Fig. 3 is an elevation partly in section to an enlarged scale taken on the line 3—3 of Fig. 1, Fig. 4 is an end elevation, Fig. 5 is a detail view of the device employed for moving articles to be graded across the scale pans, Fig. 6 is a detail view of one of the scale pans, Fig. 7 is a plan of a modified form of scale pan and Fig. 8 is a view of an automatic check device for controlling the feed of articles to the scale pans, Referring first to Figs. 1–6 the machine comprises a turntable 1 having a number of radial grooves 2 formed therein for the reception of eggs which are placed over apertures 3 in the grooves, India rubber seatings being preferably provided to prevent damage to the eggs. The eggs are carried from the turntable 1 over a series of scale pans 4, 5, 6, 7 which alternate with fixed platforms 8, the upper surfaces of both the platforms 8 and the scale pans 4–7 being grooved, as shown at 9 in Fig. 6, to prevent eggs from rolling off sideways. The eggs are moved by pairs of gripping members which are shown in detail in Fig. 5, these members comprising in each case a pair of co-operating cups 10 carried at the lower ends of arms 11 pivoted on rods 12 which extend longitudinally of a carriage 13, the rods 12 being connected by springs 14 and being formed integral with or fixed to arms 15 which extend in opposite directions, as shown in Fig. 5, and receive between them a bar 16 operated by reciprocation of the carriage 13 as hereinafter described.

The carriage 13 is provided with downwardly extending slotted lugs 17 which engage over rails 18 carried by standards 19 extending upwardly from a base plate 20 supported by a framework 21 from the floor and having transverse members 22 on which the driving mechanism is mounted as hereinafter described.

The carriage 13 is reciprocated by means of a rocking lever 23 pivoted at its lower end, as at 23ª to a downwardly extending bracket 24 fixed at one end of the carriage, the lever 23 being also pivotally connected, as at 23ᵇ to the bar 16 which is pivotally connected at its opposite end by a link 24ª to the forward end of the carriage. The lever 23 is connected by means of a longitudinally adjustable member 25 to a rocking arm 26 pivoted to a bracket 27 fixed to the framework and connected at its lower end by a link 28 to a crank 29 on a main driving shaft 30 supported from one of the transverse members 22 of the framework.

The scale pans 4–7 are all of similar construction and are mounted as shown in Fig. 6 on standards 31 fixed to the base plate 20. The standards 31 have knife edges 32 on their upper ends which support brackets 33 to whose outer ends the scale pans proper are pivotally connected at 34, the base of each scale pan being provided with a bent arm 35 extending beneath its support bracket 33 to limit the rocking movement of the scale pan relative to the bracket. The rear of the bracket 33 is provided with a screw threaded arm 36 on which counter-balance weights 37 are adjustably mounted. After a scale pan has been rocked to discharge an egg or the like the weights restore it to normal position and oscillation of the bracket 33 is prevented by a damper bar 38 mounted on arms 39 pivoted to the base plate 20 and operated by a link 41 and a bent arm or lever 42 pivoted on a bracket 43 carried by the framework and carrying a roller 44 at its lower end contacting with the surface of a cam 45 on the main shaft 30. The damper bar is normally maintained in its lower position by a spring or springs 40 anchored at their lower ends to the base plate 20. The cam 45 is so shaped and timed that the damper bar 38 is only released and lifted when the carriage is moving to feed eggs onwards and makes a downward movement immediately after the weighing operation.

The power shaft 30 which is driven from a motor 46 through a gear box 47 also carries a crank 48 from which extends a rod 49 whose opposite end carries a pawl engaging a ratchet wheel 50 on the spindle 51 of the turntable. The eggs are discharged from the scale pans into channels 52 which are inclined downwardly and from which eggs pass into collecting trays 53 which may be conveniently hinged to the framework 21 as shown at 54 in Fig. 4 so that they can be folded downwards when not in use.

Figure 2:
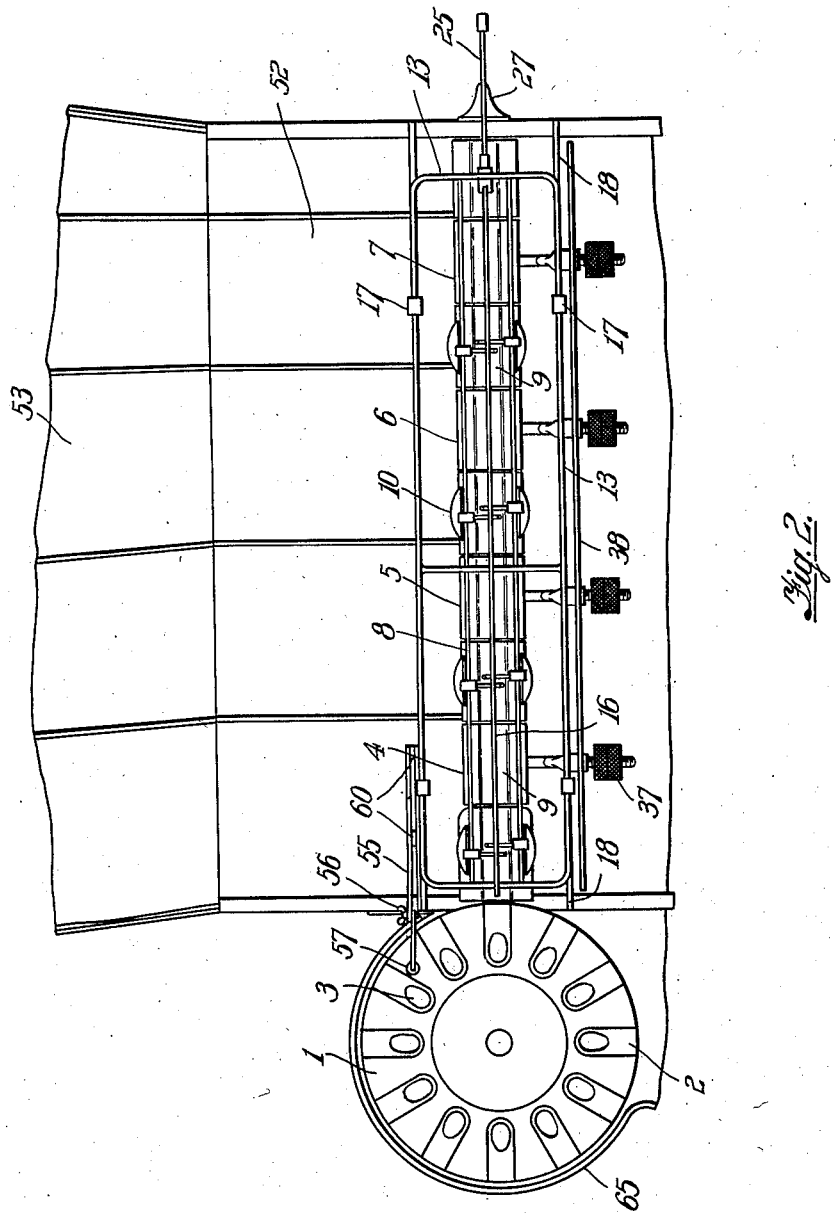
Fig. 2 is a partial plan to an enlarged scale.

The machine also includes an automatically operated device for stamping each egg as it is carried around by the turntable 1, with an indication of its origin or any other wording or device. This stamping mechanism is shown in Figs. 2 and 3 and comprises an arm 55 adjustable by a wing nut and slot arrangement 56 and having a rubber faced stamping element 57 at its outer end which is carried by a stem 58 yieldable with respect to the arm 55 against a spring 59. The arm 55 is carried by two links 60 whose lower ends are pivotally mounted on a fixed bracket 61 one end of which carries an inking pad 62 whilst the other end caries an adjustable stop 63 which limits the movement of the links 60 in one direction. The stamping device is operated by a roller 64 mounted on one side of the carriage 13 so that the stamp is moved from a rest position on the inking pad 62 to a position in advance thereof where it makes an impression on an egg held on the turntable 1 after which it is returned to normal position by a spring 64ª secured to one of the links 60 and to the bracket 61.

The operation of the machine described above is as follows:—

As the main shaft 30 rotates the turntable 1 is also rotated to bring the eggs, by a step by step movement, first beneath the stamp 57 and secondly into a position in line with the scale pans. A reciprocatory movement of the carriage 13 towards the left Figs. 2 and 3 brings the end pair of gripping members 10 over the turntable 1 but before the carriage moves towards this position the bar 16, owing to the pivotal mounting of its supporting members 23 and 24ª, moves slightly downwards so as to bear upon the arms 15 and forces the members 10 apart against the action of their spring 14. Thus the gripping members 10 are opened before the carriage moves towards the left (Figs. 2 and 3). After the opening of the members 10 continued movement of the lever 23 forces the carriage itself towards the left until the leading pair of gripping members is over the turntable and the three remaining pairs of gripping members are brought over the scale pans 4–6. As the carriage begins its return movement, that is towards the right (Figs. 2 and 3) the bar 16 is lifted slightly with the result that the springs 14 close the gripping members 10 around the eggs and they are carried towards the right as the carriage completes its return movement, all four eggs being thereby transferred to the scale pans 4, 5, 6 and 7. In the meantime the turntable 1 is given a further partial rotation to bring another egg into line with the carriage. Each scale pan is adjusted to respond to a different weight. Light weight eggs pass over the scale pan 4 without affecting it as this pan is adjusted to weigh the heavier eggs. When an egg of sufficient weight reaches this scale pan both the scale pan and the bracket 33 tilt about the standard 31 so that the egg is discharged through the channel 52 into one of the compartments of the collecting tray 53. Any eggs which reach the fixed platform beyond the fourth scale pan 7 being of the lightest weights are discharged therefrom during the return movement of the carriage and by the action of the right hand pair of gripping members.

As the carriage 13 reaches the extremity of its movement towards the right the eggs are positioned above the respective scale pans but are still retained by the gripping members 10 and it is only when the carriage again starts to move towards the left that the gripping members are released by the bar 16 and weighing takes place, the eggs passing into the respective compartments as already described or remaining on the scale pans if under weight ready for the next operation. The damper bar 38 is then timed to come into operation to restore scale pans and brackets 33 to normal position and prevent oscillation of the latter. The gripping members still in their open position are again moved towards the left and the cycle of operations above described is repeated.

Fig. 1 shows a convenient arrangement of a machine embodying two turn-tables and a double arrangement of the scale pans and collecting trays above described.

The turntable is surrounded by a casing 65 within which a lamp can be disposed and the eggs placed in front of an opening 66 in the casing to test their quality in known manner. The lamp thus disposed will also allow the eggs on the turntable to be collectively examined owing to the apertures 3 in the turntable.

Figs. 7 and 8 show modifications in the construction of the machine above described to adapt it for testing the weights of tennis balls. In this construction the scale pan 9ª is flat and has a central aperture surrounded by a beading 70 upon which the ball is positioned. In this form of the invention the balls whose weights are to be tested are fed down a chute instead of utilizing a turntable as is necessary in the case of fragile articles such as eggs. Balls passing down a chute 71 are held by a detent 72 formed at the end of a bent arm 73, the other end 74 of which also provides a detent capable of projecting through a slot in the trackway leading to the scale pans. This arm 73 is mounted on a fixed pivot 75 and has a counter-balance weight 76. On the pivot 75 is also mounted an arm 77 which is struck by the carriage on its return movement so as to remove the detent 72 and allow one ball to move forward until it is stopped by the detent 74 projected upwardly when 72 is lowered. As the carriage changes its direction of movement the arm 77 is disengaged and the weight 76 restores the parts to the position shown.

It is to be understood that in addition to the applications above mentioned machines can be constructed to deal with articles of all kinds which have to be graded by weight. For example substances in packages or packets can be dealt with by varying slightly the shape of the gripping elements 10.

I claim:—

1. Apparatus for grading articles by weight, comprising a series of scale pans each responsive to a different weight, means for delivering the articles to be graded, one at a time, adjacent one end of said series of scale pans, a carriage mounted above said scale pans for reciprocation relatively to said scale pans and article-delivering means, a series of pairs of gripping elements on said carriage operative during the reciprocation of said carriage to transfer the articles from said delivering means to said scale pans, means normally and yieldingly holding the gripping elements of each pair of said elements together, means for reciprocating said carriage, said carriage-reciprocating means including a member movable relatively to said carriage during the movement of said carriage toward said article-delivering means, and arms carried by said gripping elements and engaged by said member during the movement of the latter to separate each pair of gripping elements and hold them in separated position during the movement of said carriage toward said article-delivering means.

2. Apparatus for grading articles by weight, comprising a series of scale pans each responsive to a different weight, means for delivering the articles to be graded, one at a time, adjacent one end of said series of scale pans, a carriage mounted above said scale pans for reciprocation relatively to said scale pans and article-delivering means, a series of pairs of gripping elements on said carriage operative during the reciprocation of said carriage to transfer the articles from said delivering means to said scale pans, means normally and yieldingly holding the gripping elements of each pair of said elements together, means for reciprocating said carriage, said carriage-reciprocating means including a lever and a link pivoted to said carriage and a bar pivoted to said lever and link and moved thereby relatively to said carriage during the movement of said carriage toward said article-delivering means, and arms carried by said gripping elements and engaged by said bar during the movement of the latter to separate said pairs of gripping elements and hold them separated during the movement of said carriage toward said article-delivering means.

3. Apparatus for grading articles by weight, comprising a series of scale pans each responsive to a different weight, means for delivering the articles to be graded, one at a time, adjacent one end of said series of scale pans, a carriage mounted above said scale pans for reciprocation relatively to said scale pans and article-delivering means, a series of pairs of gripping elements on said carriage operative during the reciprocation of said carriage to transfer the articles from said delivering means to said scale pans, said gripping elements being pivoted to said carriage, a spring normally holding the gripping elements of each pair of said elements together, arms fixed to the gripping elements of each pair of said elements and arranged in crossed relation, means for reciprocating said carriage, said carriage-reciprocating means including a lever and a link pivoted to said carriage and a bar pivoted to said lever and link and moved thereby relatively to said carriage during the movement of said carriage toward said article-delivering means, said bar being disposed between said crossed arms and moving said arms during its movement to separate said pairs of gripping elements and hold them separated during the movement of the carriage toward said article-delivering means.

ERNEST JAMES HISCOCK.